United States Patent
Marupaduga et al.

(10) Patent No.: US 10,548,064 B1
(45) Date of Patent: Jan. 28, 2020

(54) CONTROLLING RELAY BROADCAST OF SYSTEM MESSAGING BASED ON DONOR BASE STATION AIR INTERFACE UTILIZATION

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 69 days.

(21) Appl. No.: 15/840,367

(22) Filed: Dec. 13, 2017

(51) Int. Cl.
*H04W 48/10* (2009.01)
*H04W 56/00* (2009.01)
*H04W 88/08* (2009.01)

(52) U.S. Cl.
CPC ........ *H04W 48/10* (2013.01); *H04W 56/0015* (2013.01); *H04W 88/08* (2013.01)

(58) Field of Classification Search
CPC . H04W 48/10; H04W 56/0015; H04W 88/08; H04W 76/28; H04W 52/32; H04W 72/005
See application file for complete search history.

(56) References Cited

U.S. PATENT DOCUMENTS

| 8,509,681 B2* | 8/2013 | Noh .................... H04B 7/2606 455/452.1 |
| 2008/0107091 A1* | 5/2008 | Ramachandran .... H04B 7/2606 370/338 |
| 2014/0045491 A1* | 2/2014 | Van Phan ........... H04W 84/005 455/426.1 |
| 2014/0274064 A1* | 9/2014 | Al-Shalash ........... H04W 24/08 455/437 |
| 2017/0230880 A1* | 8/2017 | Oroskar ................ H04W 36/22 |
| 2018/0110037 A1* | 4/2018 | Yasukawa ............. H04W 76/14 |
| 2018/0220363 A1* | 8/2018 | Hoglund .............. H04W 48/02 |

* cited by examiner

*Primary Examiner* — Kibrom T Hailu

(57) ABSTRACT

A method and system for controlling broadcast of system messaging from a relay, where the relay provides service on a first air interface and is configured to periodically broadcast on the first air interface a system message useable by WCDs to facilitate acquisition of wireless connectivity with the relay, and where the relay is served by a donor base station over a second air interface on which the donor base station provides service. Per the disclosure, an entity detects that resource utilization on the second air interface on which the donor base station provides service is threshold high, and in response to at least that detecting, the relay is made to temporarily discontinue the periodic broadcast of the system message on the first air interface so as to prevent the acquisition of connectivity with the relay.

20 Claims, 3 Drawing Sheets

CONTROLLING RELAY BROADCAST OF SYSTEM MESSAGING BASED ON DONOR BASE STATION AIR INTERFACE UTILIZATION

BACKGROUND

A typical wireless communication system includes one or more base stations, each radiating to define one or more coverage areas, such as cells and cell sectors, in which wireless client devices (WCDs) such as cell phones, tablet computers, tracking devices, embedded wireless modules, and other wirelessly equipped communication devices, can operate. Further, each base station of the system may then be coupled or communicatively linked with core network infrastructure such as a switch or gateway that provides connectivity with one or more transport networks, such as the public switched telephone network (PSTN) and/or the Internet for instance. With this arrangement, a WCD within coverage of the system may thus engage in air interface communication with a base station and thereby communicate via the base station with various remote network entities or with other WCDs served by the system.

In general, a wireless communication system may operate in accordance with a particular air interface protocol or radio access technology, with communications from a base station to WCDs defining a downlink or forward link and communications from the WCDs to the base station defining an uplink or reverse link. Examples of existing air interface protocols include, without limitation, Long Term Evolution (LTE) (using Orthogonal Frequency Division Multiple Access (OFDMA) and Single-Carrier Frequency Division Multiple Access (SC-FDMA), Code Division Multiple Access (CDMA) (e.g., 1×RTT and 1×EV-DO), Global System for Mobile Communication (GSM), WI-FI, and BLUETOOTH. Each protocol may define its own procedures for registration of WCDs, initiation of communications, handover between coverage areas, and functions related to air interface communication.

In accordance with the air interface protocol, each of the one or more coverage areas of such a system may operate on one or more carrier frequencies (carriers) and may define a number of air interface channels for carrying information between the base station and WCDs. By way of example, each coverage area may define a pilot channel, reference channel or other resource on which the base station may broadcast a pilot signal, reference signal, or the like that WCDs may detect as an indication of coverage and may measure to evaluate coverage strength. Further, each coverage area may define a downlink control channel for carrying system information, page messages, and other control signaling from the base station to WCDs, and an uplink control channel for carrying service requests and other control signaling from WCDs to the base station, and each coverage area may define downlink and uplink traffic channels or the like for carrying bearer traffic between the base station and WCDs.

When a WCD first powers on or otherwise enters into coverage of such a system, the WCD could search for a strongest coverage area in which to operate and could then engage in signaling to acquire wireless connectivity with the base station that provides the coverage area. The WCD could then be served by the base station in a connected mode or an idle mode.

In the connected mode, the WCD may have a radio-link-layer connection with the base station, over which to engage in user-plane communication such as transmission/reception of bearer data (e.g., application-layer data). Thus, as user-plane traffic arrives at the base station for transmission to the WCD, the base station could coordinate transmission of that traffic over the air to the WCD, and as the WCD has user-plane traffic to transmit via the base station, the base station could coordinate transmission of that traffic over the air from the WCD. And in the idle mode, the WCD may lack a radio-link-layer connection but may monitor for pages from the base station and may transition to the connected mode when necessary to engage in user-plane communication.

While so served, the WCD may also monitor coverage strength from its serving base station and from adjacent base stations, to help ensure that the WCD is served with sufficiently strong coverage and perhaps with the strongest available coverage. If the WCD's coverage from its serving base station becomes threshold weak and if another base station's coverage becomes threshold strong (e.g., threshold stronger than the serving base station's coverage), the WCD may engage in signaling with its serving base station, and the serving base station may take action to coordinate handover of the WCD to the other base station.

Optimally, a wireless service provider will strategically implement base stations throughout a market area so that served WCDs can transition between the base stations' coverage areas without loss of coverage. Each base station may include an antenna structure and associated equipment, and the service provider may connect each base station by a landline cable (e.g., a T1 line) with the service provider's core network, to enable the base station to communicate on that network.

In certain locations, however, it may be impractical for a wireless service provider to run landline connections to base stations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To provide coverage in such locations, the wireless service provider may instead implement relays, each of which could be configured to operate in much the same way as a conventional landline-connected base station but could have a wireless backhaul connection to a core network. In particular, each relay could include a relay base station and an associated relay-WCD module (integrated or communicatively linked together). The relay-WCD module, and thus the relay, could then be served by an existing base station of the network, referred to as a donor base station, with the air interface between the relay-WCD and the donor base station defining a wireless backhaul connection for the relay. With this arrangement, the relay could thus conveniently communicate with the core network via the wireless backhaul connection and the donor base station.

Overview

The air interface over which such a donor base station provides wireless service could at times become heavily loaded.

One reason for this heavy load could be that when the donor base station serves a relay, the donor base station's air interface may need to carry both user-plane traffic (e.g., application-layer communications) being communicated to/from the WCDs that are served by the relay and control-plane traffic (e.g., control signaling) being communicated to/from the relay itself (e.g., between the relay and other core network entities). Further, the donor base station may serve multiple relays at once, and so its air interface may carry user-plane and control-plane traffic to/from multiple relays concurrently. And still further, the donor base station may also serve end-user WCDs (non-relay-WCDs) at the same time as it serves one or more relays, and so its air interface may additionally carry user-plane traffic to/from those end-user WCDs.

In an example implementation, the donor base station's air interface may define a certain quantity of air interface resources per unit time for carrying communication traffic. For instance, the air interface may be divided over time into subframes, and at least a portion of each subframe may be divided over time and/or frequency into a finite quantity of resource blocks and resource elements that can be modulated to carry data representing communications. Heavy load on the air interface in this context could involve a threshold high portion of these resource blocks and resource elements being used per unit time to carry communications. And given the limited quantity of these resources per unit time, such heavy load on the air interface could cause problems. For instance, heavy load could result in delayed or blocked communications of user-plane and/or control-plane traffic. Therefore, an improvement is desired.

Disclosed is a method and system to help address this issue.

In accordance with the disclosure, when a donor base station serves a relay over an air interface, a determination will be made that resource utilization on the donor base station's air interface is threshold high (e.g., that the air interface on which the donor base station provides service is threshold heavily loaded), and, in response, the relay will be made to temporarily prevent WCDs from newly acquiring wireless connectivity with the relay, while allowing one or more WCDs that are already wirelessly connected with the relay to continue being served by the relay.

To temporarily prevent WCDs from acquiring wireless connectivity with the relay, the relay will temporarily discontinue broadcasting of one or more system messages useable by WCDs to facilitate their acquisition of wireless connectivity with the relay. Absent such system message(s), a WCD that might otherwise newly acquire wireless connectivity with the relay would not acquire such connectivity. As a result, this could help control the level of load on the donor base station's air interface, by at least avoiding added communication on the donor base station's air interface related to such new connectivity or such newly served WCDs.

In a representative system, each base station will normally periodically broadcast one or more system messages that enable WCDs to acquire wireless connectivity with the base station. A WCD within coverage of a base station could thus read one or more such system messages broadcast from the base station and could use the message(s) as a basis to connect with and communicate with the base station. Examples of these system messages include, without limitation, a synchronization signal message that enables WCDs to detect the presence of coverage of the base station, and a master information block (MIB) message that indicates a structural configuration (e.g., bandwidth) of the air interface and thus enables WCDs to engage in certain communications with the base station on the air interface.

Accordingly, disclosed is a method of controlling broadcast of system information from a relay, where the relay includes an antenna structure and provides service on a first air interface, where the relay is configured to periodically broadcast on the first air interface a system message useable by WCDs to facilitate acquisition of wireless connectivity with the relay, and where the relay is served by a donor base station over a second air interface on which the donor base station provides service. The method includes detecting that resource utilization on the second air interface on which the donor base station provides service is threshold high. And the method then includes, responsive to at least the detecting that the resource utilization on the second air interface on which the donor base station provides service is threshold high, temporarily discontinuing the periodic broadcast of the system message by the relay on the first air interface so as to prevent the acquisition of connectivity with the relay.

Further, disclosed is a base station operable in a wireless communication system in which a relay provides service on a first air interface and is configured to periodically broadcast on the first air interface a system message useable by WCDs to facilitate acquisition of wireless connectivity with the relay, and in which the base station is configured to serve the relay over a second air interface on which the base station provides service. According to the disclosure, the base station includes an antenna structure through which the base station is configured to communicate on the second air interface. And the base station further includes a controller configured to carry out operations including (i) detecting that resource utilization on the second air interface on which the base station provides service is threshold high and (ii) responsive to at least the detecting that the resource utilization on the second air interface on which the base station provides service is threshold high, causing the relay to temporarily discontinue the periodic broadcasting of the system message on the first air interface, so as to prevent the acquisition of connectivity with the relay.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
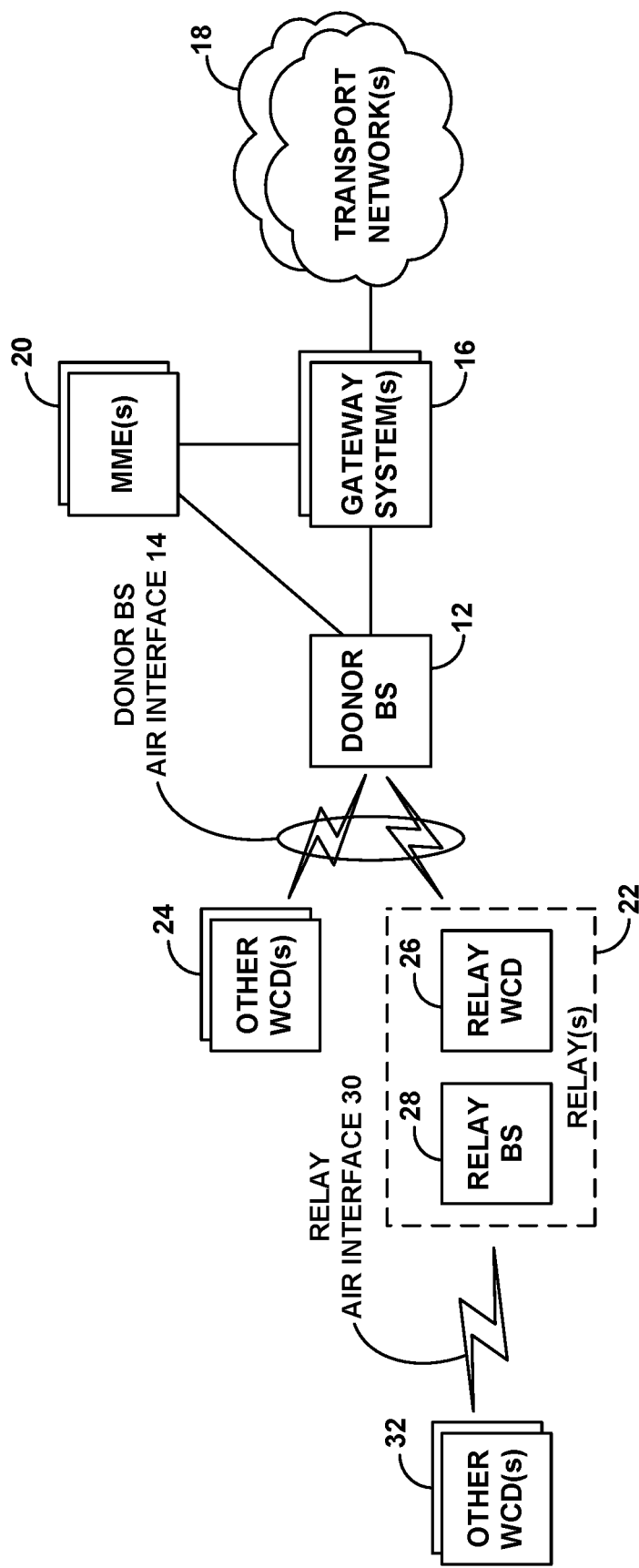
FIG. 1 is a simplified block diagram of a network arrangement in which aspects of the present disclosure can be implemented.

The present disclosure will describe implementation in the context of LTE by way of example. It will be understood, however, that the principles disclosed can be applied as well in various other contexts, such as in connection with other air interface protocols. Further, even within the context of LTE, it will be understood that variations are possible. For instance, elements and functions can be rearranged, reordered, omitted, added, combined, distributed, and/or otherwise modified. Further, it will be understood that technical operations disclosed as being carried out by one or more entities could be carried out at least in part by a processing unit programmed to carry out the operations or to cause one or more other entities to carry out the operations Referring to the drawings, as noted above, FIG. 1 is a simplified block diagram of an example wireless communication system in which features of the present disclosure can be implemented. In particular, FIG. 1 depicts a representative LTE network, which functions primarily to serve WCDs with wireless packet data communication service, including possibly voice-over-packet service, but may also provide other functions. The LTE network may be a packet-switched network, compliant with the industry standard system architecture evolution (SAE) for the LTE protocol, and thus various entities shown on the core network may each have an IP address and be configured to communicate with each other over packet-based tunnels or other communication interfaces.

As shown, the LTE network includes an example donor base station (BS) 12, which provides coverage in which to serve WCDs and has interfaces through which to communicate with various other network entities. In particular, the donor base station could include an antenna structure and associated equipment/components (not shown) for providing service on one or more LTE carriers structured to define an air interface 14 of the donor base station and could serve various WCDs over that air interface 14. Further, the donor base station could be interfaced with one or more gateway systems 16 that provide for communication with other network entities and communication on one or more external transport networks 18, and the donor base station could be interfaced with one or more mobility management entities (MMES) 20 that operate to control various operations in the network.

Shown being served by the donor base station on air interface 14 is then a representative relay 22, as well as possibly one or more other WCDs (e.g., end-user WCDs and/or other relays) 24.

The relay 22 is shown including a representative relay-WCD 26 and a representative relay base station 28, which could be integrated and/or communicatively linked together. In line with the discussion above, the donor base station 12 in this arrangement could thus serve the relay 22 by serving the relay-WCD 24 in much the same way that a base station would serve any WCD. Further, the relay-WCD 24 could interface with the relay base station 28. And the relay base station could include an antenna structure and associated equipment/components (not shown) for providing service on one or more LTE carriers structured to define an air interface 30 of the relay base station 28 and could serve one or more other WCDs (e.g., end-user WCDs and/or other relays).

With this arrangement, as discussed above, the donor base station 12 and the relay base station 30 could operate as standard LTE base stations from the perspective of WCDs that they serve. As such, a WCD that enters into coverage of either base station could detect the presence of the coverage and could then engage in signaling to acquire wireless connectivity with the base station and, if appropriate, to attach or register for service with the network. This could happen initially when a WCD first powers on within the base station's coverage or perhaps later as the WCD is scanning for possible handover from another coverage area.

In LTE, a base station's air interface on a given carrier frequency spans a defined frequency bandwidth (either separate bandwidths for downlink and uplink, or shared bandwidth multiplexed over time for downlink and uplink) such as 1.4 MHz, 3 MHz, 5 MHz, 10 MHz, 15 MHz, or 20 MHz. Further, the air interface is divided over time into 10-millisecond frames, which are in turn divided into ten 1-millisecond subframes or transmission time intervals. Across the carrier bandwidth, each subframe is then divided over time and frequency to define a finite number of physical resource blocks (PRBs), each 180 kHz wide, and each PRB is divided over time and frequency to define a finite number of resource elements that can be modulated to carry data.

On the downlink and uplink, LTE reserves certain of these resources for use to carry particular communications.

For instance, in each downlink subframe, a first portion of time across the bandwidth is generally reserved as a control region to carry control signaling from the base station to WCDs served by the base station, and the remaining time across the bandwidth is generally reserved as a downlink shared channel for carrying communications within PRBs per scheduling by the base station. Further, various resource elements throughout each downlink subframe are reserved for other purposes, such as to carry system messages and downlink reference signals.

In each uplink subframe, on the other hand, certain PRBs at the low end and high end of the frequency bandwidth are generally reserved as a control region to carry control signaling to the base station from WCDs served by the base station, and the remainder of the frequency bandwidth is generally reserved as an uplink shared channel for carrying communications within PRBs per scheduling by the base station. Further, certain resources throughout each uplink subframe are reserved for other purpose, such as to carry random access signaling and uplink reference signals for instance.

As noted above, a base station providing such an LTE coverage area could periodically broadcast one or more system messages that are useable by WCDs as a basis to facilitate acquisition of connectivity with the base station. The system message at issue here could define information that technically enables a WCD to gain connectivity with the base station, as opposed to a flag or the like that merely provides whether the WCD should or should not seek to connect.

By way of example, the base station could periodically broadcast a system message that defines a primary and/or secondary synchronization signal that has a defined format and/or value and is centered on the carrier's bandwidth with specific timing (e.g., in certain expected subframes per frame), and a WCD could discover presence of the base station's coverage by scanning for and finding such a system message. In particular, the WCD could scan a known center frequency in search of a primary synchronization signal of an expected format and/or value and upon finding that signal could conclude that LTE coverage exists on a carrier centered at that frequency. Further, discovery of this synchronization signal could inform the WCD of relative frame timing and thus enable the WCD to engage in further communication with the base station, including signaling to acquire wireless connectivity with the base station. Conversely, if the WCD does not find such a synchronization signal, in theory the WCD may be technically unable to detect the base station's coverage and to acquire wireless connectivity with the base station.

As another example, an LTE base station could periodically broadcast a system message in the form of a master information block (MIB) in which the base station specifies certain key attributes, such as one or more structural configurations, of the base station's air interface, and knowledge of this information could additionally enable WCDs to acquire wireless connectivity with the base station. For instance, the base station could broadcast the MIB in a group of PRBs centered on the carrier's center frequency and could indicate within the MIB the bandwidth of the carrier, i.e., how wide the carrier is in the frequency domain.

Once a WCD has discovered the presence of LTE coverage centered at a particular frequency and has learned the relative frame timing of the air interface, the WCD could thus find and read the MIB broadcast by the base station and could thereby determine how wide the carrier is around that center frequency. Given knowledge of the relative frame timing and frequency bandwidth centered on the carrier's center frequency, the WCD could thereby learn where, in time and frequency, certain LTE air interface channels are defined on the carrier—such as where particular control channels are defined and where PRBs and other resources are located, both for downlink and uplink communication. With this knowledge, the WCD can likewise then engage in further communication with the base station, including signaling to acquire wireless connectivity with the base station. Conversely, if the WCD does not find the base station's MIB, the WCD may be technically unable to determine where the various air interface channels are located and may thus be technically unable to acquire wireless connectivity with the base station.

Other examples of system messages useable by a WCD to enable acquisition of wireless connectivity with the base station may be possible as well.

The process of a WCD acquiring wireless connectivity with a base station could take various forms.

By way of example, after discovering the presence of the coverage and determining air interface attributes such as relative frame timing and carrier bandwidth as discussed above, and the WCD could then transmit an access request to the base station on a random-access channel defined on the air interface. The base station could then transmit on a defined control channel to the WCD a random access response message assigning to the WCD a temporary identifier and granting certain uplink PRB(s) for use by the WCD for the WCD to request a radio-link-layer connection with the base station. And the WCD could then transmit to the base station in the assigned PRB(s) a Radio Resource Control (RRC) connection request, requesting establishment of a radio-link-layer connection and thus wireless connection with the base station, and the base station could respond with a grant of the request. Further, the WCD could then transmit via the established connection to the base station an attach request, which the base station could forward to an MME for processing. And the MME could then coordinate establishment for the WCD of various bearers within the network for carrying data between the WCD and a PGW, and assignment of an Internet Protocol (IP) address to the WCD, to enable the WCD to engage in packet-data communication.

As another example, if the WCD is already connected with and served by one base station and detects coverage of another base station for possible handover, likewise after determining attributes of that coverage, the WCD might report the detected coverage to its current serving base station to trigger a handover process and/or the WCD may more autonomously engage in a handover process. As part of this handover process, the WCD may then similarly engage in random access signaling and RRC connection signaling with the new base station to establish an RRC connection with the new base station. And the network could transfer the WCD's bearer(s) to the new base station, to enable the WCD to engage in packet-data communication via the new base station.

Once a WCD is so connected with a base station, the base station could then provide the WCD with wireless packet-data communication service over the base station's air interface, with control signaling passing between the WCD and the base station, and with the base station scheduling use of PRBs as necessary for transmission of data to/from the WCD. For instance, when data arrives for transmission to the WCD, the base station could allocate certain PRBs in a subframe and could transmit to the WCD in the downlink control region of that subframe a scheduling directive specifying the allocated PRBs, and the base station could transmit the data to the WCD in the specified PRBs. And when the WCD has data to transmit, the WCD could transmit in an uplink control region to the base station a scheduling request, the base station could allocate certain PRBs in an upcoming subframe and could transmit to the WCD a scheduling directive specifying the allocated uplink PRBs, and the WCD could transmit the data to the base station in the specified PRBs of the upcoming subframe.

This process would apply both for an end-user WCD served by a base station and for a relay-WCD served by a base station.

For the end-user WCD, the packet-data communications over the base station's air interface could be packet-data communications in which the WCD engages on an external transport network 18, with the data flowing over one or more bearers between the external network and the base station and over the air between the base station and the WCD.

For the relay-WCD, on the other hand, the packet-data communications could be more management signaling, such as communication between the relay-WCD and a relay-gateway or associated entity or entities in the network. Further, the relay-WCD's packet-data communications could also include all of the communications between the relay base station and other network entities. In particular, this would include all packet-data communications of WCD served by the relay base station, as well as control signaling to/from the relay base station itself (such as signaling with neighboring base stations to manage interference or load and signaling with an MME to facilitate paging, tracking area updates, and the like).

In practice as noted above, the donor base station's air interface 14 in such a scenario (for instance) could become heavily loaded as a result of the air interface carrying not only communication traffic related to the donor base station's service of the relay-WCD 26 but also communication traffic associated with the relay base station 28 and communication traffic associated with the WCDs 32 served by the relay base station 30, not to mention communication traffic associated with other WCDs 24 served directly by the donor base station 12.

As noted above, given the finite capacity of the donor base station's air interface 14, at some point the level of communication traffic (user-plane and/or associated control signaling) on the donor base station's air interface 14 could create issues. For instance, given a threshold high level of load on the donor base station's air interface 14, the air interface 14 may have insufficient capacity to transmit certain control-plane and/or user-plane traffic, which could result in delayed, blocked, and/or dropped calls or other communications and could prevent timely signaling between the relay base station and other network entities, resulting in still other issues.

To help address this scenario, the present disclosure provides for determining that the donor base station's air interface is threshold highly loaded and responsively taking action to help limit additional load on the donor base station's air interface. Namely, in response to detecting the threshold high level of load on the donor base station's air interface, the relay 22 (particularly the relay base station 28) could be made to temporarily discontinue broadcast of one or more system messages that would be used to facilitate WCD acquisition of connectivity with the relay, while still allowing one or more WCDs that are already connected with the relay to remain connected with the relay.

Figure 2:
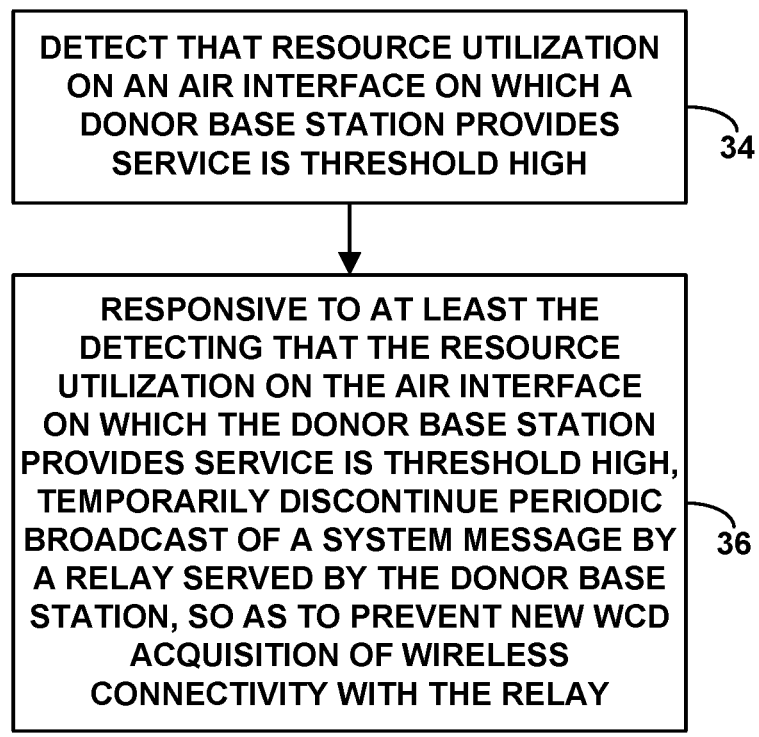
FIG. 2 is a flow chart depicting functions that can be carried out in accordance with the present disclosure.

FIG. 2 is a flow chart illustrating this process by way of example. In particular, this process can be carried out to facilitate controlling broadcast of system messaging from a relay (e.g., from a relay base station), in a scenario where the relay includes an antenna structure and provides service on a first air interface, where the relay is configured to periodically broadcast on the first air interface a system message useable by WCDs to facilitate acquisition of wireless connectivity with the relay, and where the relay is served by a donor base station over a second air interface on which the donor base station provides service.

As shown in FIG. 2, at block 34, the process includes detecting that resource utilization on the second air interface on which the donor base station provides service is threshold high. And at block 36, the process includes, responsive to at least the detecting that the resource utilization on the second air interface on which the donor base station provides service is threshold high, temporarily discontinuing the periodic broadcast of the system message by the relay on the first air interface so as to prevent (i.e., while so discontinued) the acquisition of connectivity with the relay.

In line with the discussion above, the system message at issue here could comprise an indication of structural configuration of the first air interface on which the relay provides service, and that indication of structural configuration could be useable to facilitate the acquisition of connectivity with the relay. In that case, the act of discontinuing the periodic broadcast of the system message could thus involve discontinuing the providing of the indication of structural configuration of the first air interface, and discontinuing the providing of the indication of structural configuration of the first air interface could have the effect of preventing the acquisition of connectivity with the relay.

As further discussed above, the first air interface on which the relay provides service could occupy a carrier frequency having a frequency bandwidth, and the indication of structural configuration could comprise an indication of the frequency bandwidth. Further, the system message could comprise a MIB that carries an indication of carrier bandwidth useable to facilitate the acquisition of wireless connectivity with the relay, in which case the act of discontinuing broadcast of the system message could involve discontinuing broadcast of the MIB.

Alternatively or additionally, the system message could comprise a synchronization signal (message) useable to facilitate detecting of coverage provided by the relay, in which case the act of discontinuing broadcast of the system message could involve discontinuing broadcast of the synchronization signal.

In this process, the act of detecting that the resource utilization on the second air interface is threshold high could be carried out by the donor base station, and the act of temporarily discontinuing the periodic broadcast of the system message responsive to the detecting could involve signaling from the donor base station to the relay to cause the relay to temporarily discontinue the periodic broadcasting of the system message. For instance, the donor base station could transmit to the relay base station of the relay (e.g., via an X2 interface or via signaling to the relay-WCD for passage in turn to the relay base station) a control-plane message that directs the relay base station to do this, and the relay base station could be programmed with logic that causes the relay base station to do this in response to the control-plane message from the donor base station. Alternatively, one or more other network entities could be involved.

In addition, as further discussed above, the second air interface on which the donor base station provides service could span at least one carrier frequency and defines air-interface resources for carrying communications, and the act of detecting that resource utilization on the second air interface is threshold high could involve detecting that at least a predetermined threshold portion of the air-interface resources are used. Further, the second air interface could encompass more than one carrier frequency, in which case the resource utilization metric could be with respect to the combination of those carrier frequencies.

The measure of resource utilization at issue could be with respect to some or all of the air interface resources on the second air interface, including perhaps the PRBs of the second air interface per unit time (e.g., per subframe, per frame, etc.) and/or the resources of the control region similarly per unit time. Further, the measure could be with respect to the downlink aspect of the air interface and/or the uplink aspect of the interface. In practice, the measure could be a percentage use or another such metric. And the threshold at issue for high resource utilization could be a predetermined threshold level (e.g., a threshold percentage that is in the range of 75% to 100%, or another value), defined by engineering input or another procedure to represent when the load would be possibly problematic as noted above for instance.

In this process, the act of detecting that at least the predetermined threshold portion of the air-interface resources are used can be predictive based on past use. For instance, the donor base station or other entity could track the level of utilization of the second air interface over time, and the detecting could be based on a perceived growth of the utilization over time toward a problematic level. Or based on such tracking, the donor base station could determine that at particular days and/or times, the air interface had tended to be threshold highly loaded (e.g., resource utilization being threshold high), and the donor base station could then predict that the resource utilization is threshold high based on the donor base station determining that such a day or time is present or approaching.

As discussed above, this process can beneficially prevent additional WCD connection with the relay while not causing any WCDs that are currently connected with the relay to disconnect with the relay. For instance, with discontinuing broadcast of the MIB or synchronization signal(s), WCDs would not newly connect with the relay base station, but WCDs currently served by the relay base station may be able to continue being served by the relay base station, as they have already made use of the MIB and synchronization signal information to initially connect.

Figure 3:
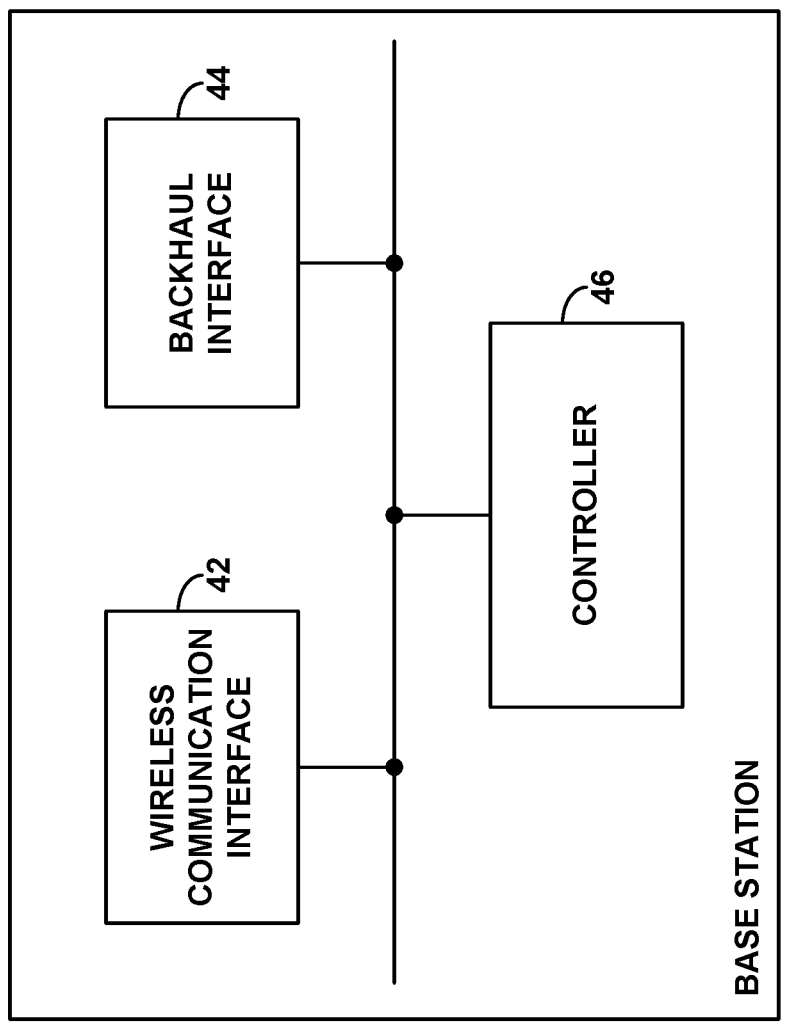
FIG. 3 is a simplified block diagram of a base station operable in accordance with the disclosure.

Finally, FIG. 3 is a simplified block diagram of an example base station, such as donor base station 12 discussed above for instance. This base station is operable in a wireless communication system in which a relay provides service on a first air interface and is configured to periodically broadcast on the first air interface a system message useable by wireless client devices to facilitate acquisition of wireless connectivity with the relay, and in which the base station is configured to serve the relay over a second air interface on which the base station provides service.

The example base station could take various forms, such as a macro base station of the type that typically includes an antenna tower and provides a broad range of coverage, or a small cell (e.g., femtocell) or itself a relay, which typically has a much smaller form factor and provides a smaller range of coverage. As shown, the example base station includes a wireless communication interface 42 through which to engage in communication with WCDs served by the base station, a backhaul communication interface 44 through which to engage in communication with other base stations and with various network infrastructure, and a controller 44 configured to cause the base station to carry out various base station operations described herein.

In practice, the wireless communication interface 42 may include a transceiver configured to serve WCDs in accordance with one or more air interface protocols such as those noted above, along with a power amplifier and antenna structure that radiates to provide for air interface communication between the base station and served WCDs. The backhaul communication interface 44 may then comprise a wired or wireless network communication module, such as an Ethernet interface, through which the base station can communicate with other entities.

The controller 46 may also take various forms, including various combinations of hardware, firmware, and software for instance. By way of example, the controller could comprise one or more general purpose processors (e.g., microprocessors) and/or one or more special purpose processors (e.g., application specific integrated circuits), and one or more non-transitory data storage elements (e.g., magnetic, optical, and/or flash storage). The data storage could then hold program instructions executable by the processor(s) to carry out various base station functions described herein, and could further hold various reference data.

In an example implementation, the controller 46 may thus be arranged to (i) detect that resource utilization on the second air interface on which the base station provides service is threshold high and (ii) responsive to at least the detecting that the resource utilization on the second air interface on which the base station provides service is threshold high, cause the relay to temporarily discontinue the periodic broadcasting of the system message on the first air interface, so as to prevent the acquisition of connectivity with the relay.

Various features described above can be applied in this context, and vice versa.

Exemplary embodiments have been described above. Those skilled in the art will understand, however, that changes and modifications may be made to these embodiments without departing from the true scope and spirit of the invention.

We claim:

1. A method of controlling broadcast of system messaging from a relay, wherein the relay includes an antenna structure and provides service on a first air interface, wherein the relay is configured to periodically broadcast on the first air interface a system message useable by wireless client devices to facilitate acquisition of wireless connectivity with the relay, and wherein the relay is served by a donor base station over a second air interface on which the donor base station provides service, the method comprising:

detecting that resource utilization on the second air interface on which the donor base station provides service is threshold high; and
   responsive to at least the detecting that the resource utilization on the second air interface on which the donor base station provides service is threshold high, temporarily discontinuing the periodic broadcast of the system message by the relay on the first air interface so as to prevent the acquisition of connectivity with the relay.

2. The method of claim 1,
   wherein the system message comprises an indication of structural configuration of the first air interface on which the relay provides service, the indication of structural configuration being useable to facilitate the acquisition of connectivity with the relay,
   wherein discontinuing the periodic broadcast of the system message comprises discontinuing providing the indication of structural configuration of the first air interface, thereby preventing the acquisition of connectivity with the relay.

3. The method of claim 2, wherein the first air interface on which the relay provides service occupies a carrier frequency having a frequency bandwidth, and wherein the indication of structural configuration comprises an indication of the frequency bandwidth.

4. The method of claim 1, wherein the system message comprises a master information block (MIB) that carries an indication of carrier bandwidth useable to facilitate the acquisition of wireless connectivity with the relay, wherein discontinuing broadcast of the system message comprises discontinuing broadcast of the MIB.

5. The method of claim 1, wherein the system message comprises a synchronization signal useable to facilitate detecting of coverage provided by the relay, wherein discontinuing broadcast of the system message comprises discontinuing broadcast of the synchronization signal.

6. The method of claim 1, wherein the detecting that resource utilization on the second air interface is threshold high is done by the donor base station.

7. The method of claim 6, wherein temporarily discontinuing the periodic broadcast of the system message responsive to the detecting comprises:
   signaling from the donor base station to the relay to cause the relay to temporarily discontinue the periodic broadcasting of the system message.

8. The method of claim 1,
   wherein the second air interface on which the donor base station provides service spans at least one carrier frequency and defines air-interface resources for carrying communications, and
   wherein detecting that resource utilization on the second air interface is threshold high comprises detecting that at least a predetermined threshold portion of the air-interface resources are used.

9. The method of claim 8, wherein the at least one carrier frequency comprises a plurality of carrier frequencies.

10. The method of claim 8, wherein detecting that at least the predetermined threshold portion of the air-interface resources are used is predictive based on past use.

11. The method of claim 8, wherein the air-interface resources are physical resource blocks whose use is scheduled by the donor base station.

12. The method of claim 1, wherein discontinuing broadcast of the system message does not cause any wireless client devices currently connected with the relay to disconnect from the relay.

13. A base station operable in a wireless communication system in which a relay provides service on a first air interface and is configured to periodically broadcast on the first air interface a system message useable by wireless client devices to facilitate acquisition of wireless connectivity with the relay, the base station being configured to serve the relay over a second air interface on which the base station provides service, the base station comprising:
- an antenna structure through which the base station is configured to communicate on the second air interface; and
- a controller configured to carry out operations including (i) detecting that resource utilization on the second air interface on which the base station provides service is threshold high and (ii) responsive to at least the detecting that the resource utilization on the second air interface on which the base station provides service is threshold high, causing the relay to temporarily discontinue the periodic broadcasting of the system message on the first air interface, so as to prevent the acquisition of connectivity with the relay.

14. The base station of claim 13, wherein causing the relay to temporarily discontinue the periodic broadcasting of the system message on the first air interface comprises transmitting from the base station to the relay a control message to which the relay is configured to respond by temporarily discontinuing the periodic broadcasting of the system message on the first air interface.

15. The base station of claim 13,
- wherein the system message comprises an indication of structural configuration of the first air interface on which the relay provides service, the indication of structural configuration being useable to facilitate the acquisition of connectivity with the relay,
- wherein discontinuing the periodic broadcast of the system message comprises discontinuing providing the indication of structural configuration of the first air interface, thereby preventing the acquisition of connectivity with the relay.

16. The base station of claim 15, wherein the first air interface on which the relay provides service occupies a carrier frequency having a frequency bandwidth, and wherein the indication of structural configuration comprises an indication of the frequency bandwidth.

17. The base station of claim 13, wherein the system message comprises a master information block (MIB) that carries an indication of carrier bandwidth useable to facilitate the acquisition of wireless connectivity with the relay, wherein discontinuing broadcast of the system message comprises discontinuing broadcast of the (MIB).

18. The base station of claim 13, wherein the system message comprises a synchronization signal useable to facilitate detecting of coverage provided by the relay, wherein discontinuing broadcast of the system message comprises discontinuing broadcast of the synchronization signal.

19. The base station of claim 13,
- wherein the second air interface on which the base station provides service spans at least one carrier frequency and defines air-interface resources for carrying communications, and
- wherein detecting that resource utilization on the second air interface is threshold high comprises detecting that at least a predetermined threshold portion of the air-interface resources are used.

20. The base station of claim 18, wherein detecting that at least the predetermined threshold portion of the air-interface resources are used is predictive based on past use.

* * * * *